United States Patent [19]
Morrison

[11] 3,998,166
[45] Dec. 21, 1976

[54] MULTI-RAIL SYSTEM AND METHOD OF INSTALLATION

[76] Inventor: Morrison Morrison, 2700 Neilson Way Apt. 628, Santa Monica, Calif. 90405

[22] Filed: May 19, 1975

[21] Appl. No.: 578,630

[52] U.S. Cl. .......................... 104/243; 105/215 R; 238/83; 238/288
[51] Int. Cl.² ........................................ B61B 12/02
[58] Field of Search .......... 104/243, 242, 247, 248, 104/1; 105/215 R, 157 R; 295/33, 34, 31; 238/339, 84, 83, 288, 88, 79, 90, 86, 87, 88, 89

[56] References Cited
UNITED STATES PATENTS

| 252,918 | 1/1882 | Wilson | 105/157 R |
| 734,061 | 7/1903 | Hansler | 104/242 |
| 807,723 | 12/1905 | Colby | 238/86 |
| 1,436,446 | 11/1922 | Jump | 238/288 X |
| 1,522,332 | 1/1925 | Schmitz | 295/31 R |

FOREIGN PATENTS OR APPLICATIONS

| 6,779 | 5/1915 | United Kingdom | 105/157 R |
| 22,204 | 2/1907 | United Kingdom | 295/33 |

Primary Examiner—Robert J. Spar
Assistant Examiner—James M. Slattery
Attorney, Agent, or Firm—Lyon & Lyon

[57] ABSTRACT

A multi-rail system and method of installation wherein an additional load carrying rail assembly is installed in centered relation between the rails of a conventional railroad and secured by a first set of tie plates joined to existing ties and a second set of tie plates joined to cement anchor columns located between selected ties, both sets also being joined to the existing rails; the system further including load carrying wheels engaging the additional rail assembly and supplementing the conventional car wheels, the railroad cars also provided with supplemental brakes engaging the additional rail assembly to increase the braking force, and retainers extending under the additional rail assembly for preventing excess movement of the auxiliary wheels from the additional rail assembly.

17 Claims, 10 Drawing Figures

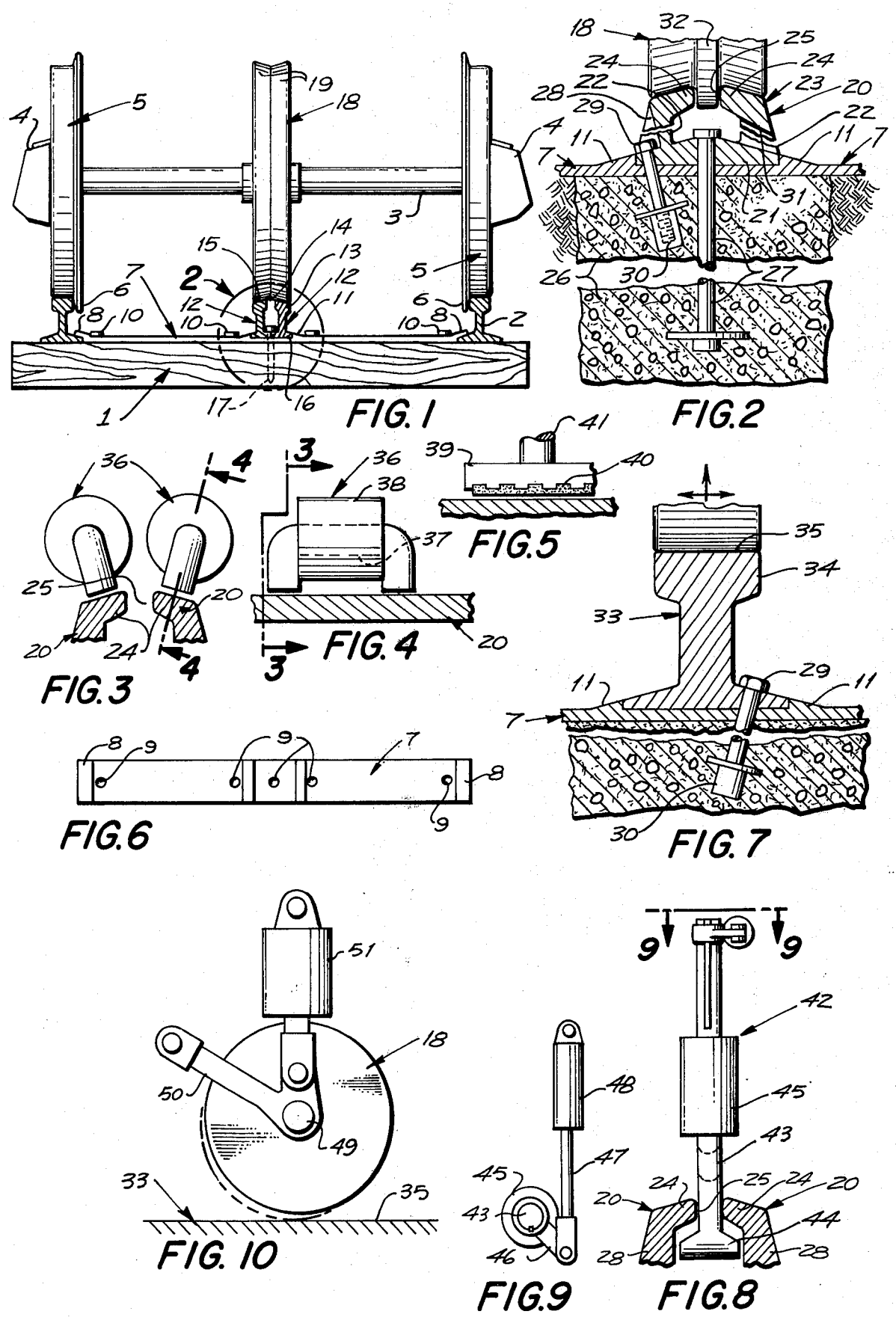

MULTI-RAIL SYSTEM AND METHOD OF INSTALLATION

BACKGROUND OF THE INVENTION

Conventional railroads are rapidly becoming obsolete. While a number of improved railroad systems have been proposed, all involve removal of existing railroads, with attendent loss of service if the right-of-way of the existing railroad is to be used. As a result, the cost has been so enormous that little actual replacement has occured.

SUMMARY OF THE INVENTION

The present invention is directed to a multi-rail system, and method of installation, which overcomes the problems of revitalizing railroads and is summarized in the following objects:

First, to provide a multi-rail system, and method of installation which may be accomplished without removal of existing railroad rails or their ties; in fact, installation may be accomplished with only such interruption of service as would be required by mere repair of the existing railroad.

Second, to provide a multi-rail system and method of installation which may be arranged to double the load carrying capacity of the existing railroad and the rail cars.

Third, to provide a multi-rail system and method of installation wherein a third load bearing rail is layed between the existing rails of an existing railroad, and the existing railroad cars are provided with additional load bearing wheels which ride on the center rail while the original wheels ride on the existing rails.

Fourth, to provide a multi-rail system and method of installation wherein the modified rail arrangement does not interfere with use of conventional rail cars thereon and the modified rail cars may be so arranged that they are capable of running on conventional tracks.

Fifth, to provide a multi-rail system and method of installation, wherein the existing railroad cars may be equipped with either mechanical shoe brakes arranged to bear downwardly on the center rail, or may be magnetic and draw upwardly thereon.

Sixth, to provide a multi-rail system wherein the auxiliary railroad rail may comprise two adjacent members, forming underlying retainer surfaces, and between which may be inserted a bar having lateral portions for engagement with the retainer surfaces, thereby preventing excess movement of the auxiliary wheels away from the auxiliary rails.

DESCRIPTION OF THE FIGURES

FIG. 1 is a transverse view of the multi-rail system, showing the rails in section and indicating a railroad tie in elevation as well as a set of wheels in elevation.

FIG. 2 is an enlarged fragmentary sectional view corresponding to the area within Circle 2 of FIG. 1, showing a modified form of the supplemental rail and wheel forming parts of the multi-rail system.

FIG. 3 is a fragmentary sectional view of the supplemental rail, shown in connection with the magnetic brake means, taken through 3—3 of FIG. 4.

FIG. 4 is a fragmentary sectional view thereof taken through 4—4 of FIG. 3.

FIG. 5 is a fragmentary sectional view corresponding to FIG. 4, showing a mechanical brake means.

FIG. 6 is a plan view of a tie web forming a part of the multi-rail system.

FIG. 7 is an enlarged fragmentary sectional view, corresponding to FIG. 2, showing a further modified form of the supplementary rail and indicating fragmentarily a wheel thereon.

FIG. 8 is a fragmentary sectional view of the supplementary rail shown in conjunction with a retainer means forming a part of the multi-rail system.

FIG. 9 is a plan view of the retainer means taken from 9—9 of FIG. 8.

FIG. 10 is an essentially diagrammatical view showing a means of mounting a supplemental wheel.

SPECIFICATION

The multi-rail system is intended to utilize a conventional railroad system, including railroad ties 1, supporting railroad rails 2, each rail having a conventional head, web and mounting flanges.

The multi-rail system also utilizes the conventional rolling stock represented by a railroad car axle 3, having end bearings 4 and provided with wheels 5, each having a flange 6.

The multi-rail system includes a set of tie webs 7 in the form of metal plates dimensioned to overlie the railroad ties 1. Each tie web 7 is provided with offset ends 8 adapted to overlie a flange of the standard railroad rails 2 and may be secured thereto by welding. Alternatively, or in addition thereto, the tie web is provided with perforations 9 to receive spikes or screw bolts 10. Centered in the tie web is a pair of retainer bosses 11.

Centered between the retainer bosses 11 is a pair of supplementary rails 12 which may be conventional railroad rails in which the flanges are modified so that the heads 13 may be closely spaced to form a slot 14. It is preferred, however, that the supplementary rails 12 be provided with upper surfaces which slope upwardly toward each other as indicated by 15. The flanges 16 of the supplementary rail 12 are held in mutual contact by the retainer bosses 11 and are secured in place by an anchor spike or bolt 17 which is driven through an opening in the tie web 7 and into the railroad tie 1.

Mounted on the axle 3, supported by the standard railroad wheels 5 is a supplementary wheel 18 having obtusely related sloping peripheral surfaces 19 conforming to the surfaces 15.

Referring to FIG. 2, in place of the supplementary rails 12 a single supplementary rail 20 may be provided. The rail 20 includes a base 21 fitting between the bosses 11. Extending upwardly from the side margins of the base 21 is a pair of webs 22 terminating in rail heads 23, including flange portions 24 forming therebetween a channel 25.

The supplementary rail 20 may be secured through the tie web 7 to a railroad tie 1, as shown in FIG. 1. It is intended that support for the supplementary rail 20 or the supplementary rails 12 include means in addition to that provided by the railroad ties 1. More specifically between selected pairs of railroad ties, concrete posts 26 are sunk into the railroad bed. Each concrete post is provided in the webs 22 and the base 21 is perforated to receive anchor bolts 29 which are connected to screwthreaded anchors 30, provided in the concrete posts 26.

As indicated in FIG. 2, the webs 22 may be provided with side openings 31. Also the upper surfaces of the rail heads 23 may slope upwardly toward each other similar to the rail heads 13. Each is supplementary wheel 18, whether used in the construction shown in FIG. 1 or in FIG. 2, may be provided with a supplementary wheel flange 32.

Referring to FIG. 7, there is illustrated a supplementary rail 33 which may be substituted for the rails 12 or 20. The rail 33 is essentially the same as a standard railroad rail, except that the width of the rail head 34 may be increased and is provided with a flat surface 35. The supplementary rail 33 is secured in the same manner as the rail 20, that is by anchor bolts 29 and anchors 30.

Referring to FIGS. 3 and 4, a railroad car modified to utilize the supplementary rails may be provided with magnetic brakes 36, each brake including a magnetic core 37 and a coil 38. Alternatively or in addition thereto, a friction brake 39 shown in FIG. 5, may be provided, which is provided with a brake lining 40 and is supported for movement toward and away from the supplementary rail by hydraulic or pneumatic means, not shown, actuating a plurality of mounting shafts 41.

Referring to FIGS. 8 and 9, the confronting flanges 24 may be used in conjunction with retainer assemblies 42. Each retainer assembly 42 includes a retainer shaft 43 having a cross bar 44. Each shaft 43 is supported by hydraulic or pneumatic unit 45 for raising or lowering the cross bar 44. The end of the cross bar and its shaft is such that it may be inserted through the channel 25 and the length of the cross bar is such that when the cross bar is rotated 90°, the extremities underlie the flanges 24. 90° rotation of the cross bar 44 may be accomplished by rotating arm 46 mounted on a shaft 47 operated by a hydraulic or pneumatic unit 48. If the carriage mounting for a set of wheels permits the retainer shaft 43, to lie centered so that on the railroad curves there is minimal lateral displacement of the retainer shaft, the longitudinal axis of the shaft may be fixed. However, if the retainer assembly is located elsewhere under the railroad car, means not shown, are provided to permit lateral movement to accomodate relative lateral displacement of the supplementary rail 20.

Referring to FIG. 10, if supplementary rail 33 is used and the supplementary wheel head is provided with a flat surface 35, the supplementary wheel may be located in offset relation to the axle 3. With this arrangement the supplementary wheel may be fixed with respect to the railroad car or may be capable of being raised and lowered. In the later case the wheel is carried by a shaft 49, supported by a pivoted lever arms 50 and moved vertically by a hydraulic or pneumatic power unit 51.

The method of installation of the multi-rail system is as follows:

The supplementary rail 20 or rails 12 may be installed while the railroad is in operation, as the installation may be accomplished with no more significant effect on use of the railroad line that is required for purposes of repair. Of course, during the installation of the system needed repairs will be made to the existing railroad line.

The tie webs 7 are first installed, those tie webs which are placed on the existing ties 1 serve by means of offset ends 8 to insure accurate spacing of the rails 2, should they have been shifted in use. The ends of the webs may be welded to the flanges of the rails 2. Alternatively or in addition, spikes or screw bolts 10 may be used. Also prior to placement of the supplemental rail concrete posts 26 are set between selected pairs of ties, the posts 26 are caped by additional tie webs 7, which are welded to the rails 2. The presence of the tie webs both on the ties and anchored to the concrete posts greatly increase the strength of the existing standard railroad line.

After the tie webs 7 are installed the supplementary rails 12 or 20 are placed between the retainer bosses 11 and thus are accurately centered between the rails 20. When secured to the ties 1 and to the concrete posts 26 the inherent strength of the system is substantially increased.

To utilize the supplemental rails, modification of course, is required of the railroad cars, while substantial change in the driving mechanism of the locomotive is required it should be noted in this regard that existing locomotives may still be used on the existing rails and may be coupled to other traction units provided with supplemental drive wheels.

In regard to the railroad cars, it is only necessary to modify the railroad car carriages. The simpliest modification is shown in FIG. 1 in which the supplementary wheel 18 is mounted on the otherwise standard railroad car axle 3. If this arrangement and the slopping surfaces 15 and 19 are utilized the increased bearing load caused by lateral displacement produces a lateral load supplementing the load applied by the wheel flanges 6 to the rails 2.

If the system is used on railroad lines in which the anchorage of the rails 2 is weakened by prior use the flange 32 may be utilized to take over the loads occasioned by lateral force supplied to the wheels.

By reason of the fact that the supplemental rails 12 and rail 20 are securely anchored against upward movement, the system permits the use of magnetic brakes 36. Also the load bearing strength of the supplementary rails is substantial to permit use of friction brakes 39.

It will be noted that not only may the new system be installed during operation of the railroad line, but also that the multi-rail system does not preclude the operation of standard or conventional rolling stock. Also it should be noted that if the supplementary wheels are made slightly less in diameter and the supplementary rails are raised in accordance therewith the modified rolling stock may move on to existing conventional railroad lines, including switching areas. The amount of height increase required for the supplemental rails railroad crossings offers no obstical to transverse traffic.

Even this amount of change may be avoided if the supplementary rail surface and wheel surface if flat as indicated in FIG. 7. As pointed out previously, these flat surfaces permit the supplementary wheels to be offset from the vertical plane through the axis of the wheels 5.

Having fully described my invention it is to be understood that I am not to be limited to the details herein set forth, but that my invention is of the full scope of the appended claims.

I claim:

1. A railroad system utilizing a standard railroad used by standard railroad cars having standard wheels the railroad having a paired series of standard railroad rails connected by standard ties, said railroad system comprising:
   a. a series of load bearing supplementary railroad rails;
   b. a series of supplementary tie webs extending between and secured to the pairs of railroad rails, said tie webs having means for receiving the supplementary railroad rails in predetermined fixed relation between the pairs of standard railroad rails;

c. supplementary load bearing wheels mounted on the railroad cars and positioned for engagement with the series of supplementary railroad rails to provide support for the railroad cars supplementing the load carried by the standard wheels;

d. and means for raising and lowering the supplementary wheels with respect to the standard wheels to permit the railroad cars to run on standard tracks and over standard switches.

2. A railroad system as defined in claim 1, wherein:

a. a series of concrete anchor posts are formed in post holes disposed between selected pairs of ties, each anchor post including an anchor member secured to a corresponding tie web.

3. A railroad system as defined in claim 1, wherein:

a. the tie webs are dimensioned to fit between the web or prepositioned standard railroad rails, and include offset ends engageable with the rail flanges;

b. and means is provided to secure tie webs to the upper surfaces of the railroad ties.

4. A railroad system as defined in claim 1, wherein:

a. each supplementary rail forms a surface essentially coplanar to the surfaces of the standard rails.

5. A railroad system as defined in claim 1, wherein:

a. each supplementary rail includes a pair of spaced wheel engaging surfaces forming a channel therebetween;

b. and each supplementary wheel riding on the supplementary rail includes a flange received in the channel to provide resistance to lateral movement.

6. A railroad system as defined in claim 1, wherein:

a. each supplementary rail includes a pair of wheel engaging surfaces defining an obtuse angle;

b. and each supplementary wheel has a pair of correspondingly obtusely related load carrying surfaces to provide resistance to lateral movement.

7. A railroad system as defined in claim 1, wherein:

a. the railroad cars are provided with supplementary braking means movable to and from the supplementary rail.

8. A railroad system as defined in claim 7, wherein:

a. the supplementary braking means is magnetic.

9. A railroad system as defined in claim 7, wherein:

a. the supplementary braking means is frictional.

10. A railroad system utilizing a standard railroad used by standard railroad cars having standard wheels the railroad having a paired series of standard railroad rails connected by standard ties, said railroad system comprising:

a. a series of load bearing supplementary railroad rails;

b. a series of tie webs extending between and secured to the pairs of railroad rails, said tie webs having means for receiving the supplementary railroad rails in predetermined fixed relation between the pairs of standard railroad rails;

c. supplementary load bearing wheels mounted on the railroad cars and positioned for engagement with the series of supplementary railroad rails to provide support for the railroad cars supplementing the load carried by the standard wheels;

d. each supplementary rail including a pair of spaced rail components having confronting flanges defining a channel therebetween the channel being laterally enlarged below the flanges;

e. and retainer shafts carried by the railroad cars having cross bars movable into the channel and turnable to place the cross bars under the flanges to resist excessive upward movement of the railroad cars with respect to the supplementary railroad rail.

11. A method of supplementing a standard railroad system, characterized by:

a. progressively laying a supplementary railroad rail between standard railroad rails;

b. adding to railroad cars movable on the standard railroad rails supplementary load carrying wheels engageable with the supplementary railroad rail;

c. and displacing the supplementary load carrying wheels in the absence of a supplementary railroad rail to permit travel of the railroad cars equipped with the supplementary load carrying wheels over a standard railroad system.

12. A method as defined in claim 11, further characterized by:

a. adding supplementary braking means cooperating with the supplementary railroad rail.

13. A method as defined in claim 11, further characterized by:

a. connecting and securing tie webs to previously installed ties between the previously installed standard rails to strengthen the connection therebetween;

b. and joining the supplementary rail to the tie webs to secure the supplementary rail in predetermined fixed relation to the standard rails.

14. A method as defined in claim 13, further characterized by:

a. sinking posts between selected standard railroad ties;

b. securing selected tie webs to the posts and to the standard railroad rails;

c. and securing the supplementary railroad rail to the standard tie webs.

15. Means for increasing the load carrying capacity of, and vehicle speed on a preexisting railroad system having a paired series of standard railroad rails, connected by standard ties, and ranged for existing traffic of standard railroad vehicles, said railroad reinforcing system comprising:

a. a series of tie webs disposed between and secured to the standard railroad rails to supplement the standard ties thereby to increase resistance of the railroad rails to traffic thereon, the tie webs being directed into two sets, a first set being secured to selected standard ties, and a second set being disposed between selected pairs of ties;

b. a series of load bearing supplemental railroad rails disposed midway between the standard rails, and secured to the tie webs, said supplemental railroad rails clearing the standard railroad vehicles to permit traffic thereof on the railroad reinforcing system;

c. a plurality of buried concrete posts underlying the second set of tie webs and the supplemental railroad rails;

d. anchor means in the concrete posts and joining the second set of tie webs and supplemental railroad rails;

e. supplemental load carrying wheels mounted under selected standard railroad vehicles for engagement with the series of supplemental railroad rails;

f. and means for raising the supplemental load carrying wheels to permit travel of the selected railroad vehicles on the preexisting railroad system.

16. A means as defined in claim 15, wherein:
a. the tie webs between supplemental series of railroad rails and the first and second set of tie rails resist application of an upward force thereon;
b. and magnetic braking means is provided on the selected standard railroad vehicles to apply an upward force on the supplemental railroad rails and an opposing downward force on vehicle.

17. A method of increasing the load carrying capacity of a preexisting railroad system and increase the safe speed of vehicles thereon, while maintaining traffic on the railroad system, characterized by:

a. placing tie webs between the existing railroad rails to supplement existing ties and increase the resistance to displacement under railroad vehicle load;
b. securing a supplemental rail to the tie webs between the existing railroad rails;
c. providing supplemental anchor means for the supplemental rail disposed between selected ties of the existing railroad system;
d. attaching to selected vehicles arranged for travel on the existing railroad rails supplemental load carrying wheels engageable with the supplemental rail;
e. and raising the supplemental wheels for passage of the vehicle over existing railroad rails.

* * * * *